United States Patent [19]

Lin

[11] Patent Number: 4,996,242
[45] Date of Patent: Feb. 26, 1991

[54] POLYURETHANE FOAMS MANUFACTURED WITH MIXED GAS/LIQUID BLOWING AGENTS

[75] Inventor: Chung Y. Lin, Orange, Conn.

[73] Assignee: The Dow Chemical Company, Midland, Mich.

[21] Appl. No.: 355,539

[22] Filed: May 22, 1989

[51] Int. Cl.$^5$ .............................................. C08K 5/00
[52] U.S. Cl. ...................................... 521/131; 252/67; 252/69; 252/182.24
[58] Field of Search ..................... 521/131; 252/67, 69, 252/182.24

[56] References Cited

U.S. PATENT DOCUMENTS 4,624,970 11/1980 Dwyer et al. ...................... 521/131
4,714,717 12/1987 Londrigan et al. ................ 521/131

Primary Examiner—John Kight, III
Assistant Examiner—Kathryne E. Shelborne

[57] ABSTRACT

Disclosed are mixed halocarbon blowing agents comprising (1) halocarbons boiling below about 10° C., (2) halocarbons boiling between 20° C. and 35° C., and (3) inert organic liquids having a boiling point from about 35° C. to about 125° C.

Also disclossed are blends of the above mixed blowing agents with active hydrogen containing compounds, particularly polyols and the rigid closed cell foams prepared from such blends.

Up to 60 percent reduction in hard halocarbons is realized with the mixed blowing agents.

11 Claims, No Drawings

POLYURETHANE FOAMS MANUFACTURED WITH MIXED GAS/LIQUID BLOWING AGENTS

FIELD OF THE INVENTION

This invention relates to mixed blowing agents and is more particularly concerned with ternary mixtures thereof, their blends with active hydrogen containing compounds, and the preparation of rigid cellular polyisocyanate based polymers utilizing said ternary blowing agents.

DESCRIPTION OF THE PRIOR ART

The use of halocarbons as refrigerants and physical blowing agents is well known and very widely practiced. Generally speaking, what divides the two types of halocarbons are their respective boiling points. Gaseous or very low boiling halocarbons serve as refrigerants while those with boiling points higher than normal ambient temperatures at atmospheric pressures are used as physical blowing agents Most prominent in the latter category is trichlorofluoromethane readily identified by the trademark name of Freon-11 (F-11). Unfortunately, this latter material has recently been categorized as a "hard" blowing agent which denotes the absence of any hydrogen atoms on the carbon atom. Conversely, those blowing agents possessed of hydrogens are termed "soft" blowing agents. This classification has arisen from the current studies regarding ozone depletion in the earth's stratosphere. It is currently suspected that an accumulation of hard halocarbons in the earth's atmosphere is at least partially the cause of this zone depletion.

Accordingly, efforts are increasing to find ways of either reducing or indeed eliminating the use of the hard halocarbons altogether. Fortunately, even their partial replacement can have a beneficial effect and it is in this approach where some success is being achieved in employing mixtures of hard halocarbons with their soft counterparts. F-11 still remains the blowing agent of choice for cellular polyurethane type polymers in respect of its atmospheric boiling point, its blowing capacity and characteristics, and its low thermal conductivity.

In the area of refrigerants, U.S. Pat. No. 4,810,403 teaches the use of halocarbon blends. This reference discloses the total replacement of the widely used dichlorodifluoromethane (F-12) with a ternary mixture of halocarbons containing hydrogen atoms. Collectively, the mixture has a temperature/pressure relation substantially equal to F-12. Thus the blends have reduced ozone depletion potentials.

In the area of blowing agents, the use of halocarbon mixtures per se is not new. Numerous types of mixtures have been suggested for the solutions of numerous types of problems. This has included mixtures of gaseous with liquid halocarbons and those mixtures wherein components included soft halocarbons. For example, U.S. Pat. No. 3,745,203 discloses mixtures of two volatile blowing agents in the production of polyurethane moldings free of surface voids. The mixtures consist of a lesser volatile component with a higher volatile component with the difference in their boiling points falling within a required range. The mixtures disclosed are essentially gaseous components dissolved in liquids with a typical combination consisting of F-11/F-12.

Japanese patent application J63/75020 discloses a particular ternary blowing agent mixture which can be used in a premix with polyols with the advantage of reduced acid formation upon storage as well as improved solubility. The mixture consists of F-11/dichlorotetrafluoroethane (F-114)/dichlorotrifluoroethane (F-123 or 123a).

U.S. Pat. No. 4,528,300 discloses an environmentally acceptable blowing agent system for polyolefins consisting of 50 to 95 weight percent of either 1-chloro-1,1-difluoroethane (F-142b) or 1,1-difluoroethane (F-152a) with 5 to 50 weight percent of an aliphatic hydrocarbon and/or a halogenated hydrocarbon having a normal atmospheric boiling point of from 0° C. to 50° C. Examples of the latter classes of hydrocarbons listed are n-butane, pentane, F-11, trichlorotrifluoroethane (F-113), dichloromonofluoromethane (F-21), 1-chloropropane, and ethyl chloride (with the latter preferred). The process requires plastifying the polyolefin, admixing it with the mixed blowing agent under pressure and extruding the product into a zone of lower pressure.

U.S. Pat. No. 4,624,970 discloses blowing agent blends of F-11 with F-123 or F-123a. The use of such blends allows for greater compatibility of the blowing agent, polyether, and polyester polyol components which allows for increased levels of low cost aromatic polyester polyols. Economics was the driving force in the use of a combination of F-11, ethyl chloride and methylene chloride as the blowing agent for polyurethane foams as taught in German patent application DT 2517272.

The area of foam technology covered by the so-called froth foaming process has become very useful in the filling of cavities or voids with polyurethane foams. The process calls for at least a gaseous blowing agent preferably a mixture of both gaseous and liquid materials. The foam ingredients including the gaseous blowing agents are first mixed under pressure then released to reduced pressure within the cavity to fill the void. Even more popular is a two-stage expansion method employing the gas/liquid combination. The lower boiling agent produces immediate frothing on pouring into the cavity giving the first stage of foaming. The higher boiling agent completes the foaming process or second stage as it vaporizes by the exotherm from the urethane forming reaction. Typical of such fluorocarbon combinations are those disclosed in U.S. Pat. No. 4,636,529 which consist of chlorodifluoromethane (F-22) mixed in certain proportions with a second blowing agent which includes F-11, F-12, F-113, F-114, or F-142b.

Japanese patent application J58/141217 teaches the preparation of a low heat conductivity rigid polyurethane foam using the blowing combination of F-114, F-11, and water. Japanese 58/219029 describes another frothing process for polyurethane foam wherein the primary blowing agent has a boiling point below 5° C. and is F-12, F-22, or F-114 while the secondary agent is F-11 or methylene chloride.

Japanese 60/88045 discloses polyurethane foams wherein the foaming agent contains F-114 in combination with F-11 and water. Japanese 60/137920 of the same assignee as 60/88045 shows the same blowing agents only the proportions with which the gaseous F-114 is employed are higher.

One of the major obstacles to the use of gaseous blowing agents in combination with F-11 is the poor solubility of the former in the latter. At the same time, the dissolution of the gaseous material in either an A side polyisocyanate or B side polyol requires much manipulation with only very minor amounts of blowing agent being soluble. One of the major difficulties is the cooling/warming cycles encountered when dissolving the volatile material in, for example, a polyol. There still remains a need for a blowing agent combination which satisfies the reduction in hard blowing agent while providing blowing properties as close to F-11 as possible, and, at the same time, avoiding the prior art problems of dissolving the gaseous component in one of the polymer forming ingredients.

SUMMARY OF THE INVENTION

The present invention is directed to mixed blowing agents comprising: (1) from about 2 to about 25 percent by weight of at least one halocarbon blowing agent having a boiling point below about 10° C.; (2) from about 30 to about 90 percent by weight of at least one halocarbon blowing agent having a boiling point of from about 20° C. to about 35° C.; and (3) from about 8 to about 45 percent by weight of an inert organic liquid having a boiling point from about 35° C. to about 125° C., and provided at least one of said components (1), (2), or (3) contains at least one hydrogen atom.

The invention is also directed to blends comprising at least one active hydrogen containing compound and from about 1 to about 50 percent by weight of said mixed blowing agents set forth above.

The invention is also directed to rigid cellular polymers prepared by bringing together under foam forming conditions aromatic polyisocyanates, active hydrogen containing compounds, and mixed blowing agents as set forth above.

The term "halocarbon blowing agent" means an aliphatic or cycloaliphatic compound having 1 to 4 carbon atoms and being partially or fully substituted by an atom selected from the group consisting of fluorine, chlorine, bromine, and mixtures thereof.

The term "boiling point" means the boiling point at normal atmospheric pressures.

The term "inert organic liquid" means a compound free of organofunctional groups and which does not react with isocyanate, hydroxyl, amine or carboxylic acid groups, and, further is selected from the group consisting of aliphatic hydrocarbons having from 5 to 8 carbon atoms, such as pentane, hexane, hexene, heptane, heptene, octane and isomeric forms thereof; cycloaliphatic hydrocarbons having from 5 to 8 carbon atoms such as cyclopentane, cyclopentene, cyclohexane, cyclohexene, cycloheptane, cycloheptene; and halocarbons defined above.

The term "active hydrogen containing compounds" means organic compounds having at least 2 active hydrogen containing groups and a molecular weight from about 225 to about 12,000 or average value thereof and is inclusive of polymeric polyols and polymeric amines.

The term "rigid cellular polymer" as used herein means a rigid cellular polymer having a closed cell content of at least 85 percent and having a recurring unit selected from the group consisting of urethane, isocyanurate, carbodiimide, urea, amide, imide, and mixtures thereof.

The mixed blowing agents of this invention meet the need for reduced levels of the hard type of agent. Notably, they provide blowing properties, particularly with polyisocyanate based cellular foams, which are quite comparable to the industry standard of F-11. Surprisingly, the resulting foams are possessed of thermal insulation properties as measured by K-factor determinations in accordance with ASTM Test Method C-518 which are also quite comparable to F-11. Additionally, although calling for a gaseous component, the mixtures can be prepared independently of any polymer forming ingredient and then mixed with the latter prior to the foam forming reaction. This is in contrast to the prior art which requires a gaseous blowing agent to be dissolved in, for example, a polyol which generally leads to a repetitive cycle of cooling/warming because of the evaporation of the gas before saturation point is reached.

Furthermore, the mixtures form compatible or miscible blends with active hydrogen compositions such as polyols including the usually difficult soluble polyester polyols.

The rigid foams can be employed for all the purposes for which the currently produced cellular products are conventionally employed and are particularly suited for applications where thermal insulation is required. For example, the foams can be employed as insulation for tanks, pipes, refrigerator and freezer cabinets and the like.

DETAILED DESCRIPTION OF THE INVENTION

The novel ternary mixed blowing agents in accordance with the present invention consist of at least one gaseous component (1) dissolved in the liquids (2) and (3) of which there are at least one of each. Reference to gaseous and liquid means their physical state under normal atmospheric pressures. Accordingly, the boiling points or ranges for the respective components (1), (2), and (3) increase from the gaseous state for the first halocarbons to the upper boiling point of 125° C. for the third type of ingredient. It should be understood that it is not absolutely necessary to premix the components in order to achieve their maximum inherent benefits as blowing agents in any cellular polymer formulations. However, in a preferred embodiment of the invention at least two of the components, for example the gas component (1) and inert liquid (3) are premixed prior to any blowing action. Even more preferred, all three components are premixed. In a most preferred embodiment all three are mixed first with an active hydrogen composition to provide yet another aspect of the present invention set forth above.

It has been discovered that the inert organic liquid (3), which will be discussed in detail below, serves to solubilize the gaseous components more readily and in larger proportions than the intermediate boiling halocarbons (2). Accordingly, the gaseous component is advantageously dissolved in the inert liquid using any convenient method known for the dissolution of gases in liquids. In one embodiment, the organic liquid is cooled to below room temperature, preferably from about 10° C. to about −60° C., more preferably from about 10° C. to about −20° C. The particular temperature will depend primarily on the boiling point of the gas and its characteristic solubility in the inert liquid. The cooling is readily achieved using known methods such as cooling baths of ice, ice-salt, ice-calcium chloride, solid carbon dioxide combined with various organic solvents such as acetone, carbon tetrachloride/chloroform mixtures, refrigeration units, and the like. During stirring of the cooled liquid the gaseous halocarbon is simply bubbled in using any convenient rate. The dissolution to saturation will occur faster when the gas is precooled by passing it through a simple cooling coil or the like. This serves to inhibit the rapid boiling off of the gas which helps to avoid the cooling/warming cycles usually encountered when dissolving gases in liquids. The temperature of the precooling is not critical but can fall within a range of from about 10° C. to about −20° C. The gas is passed into the solution until supersaturation is reached. This point is easily determined by trial and error methods but is most readily determined from material balance measurements, for example, difference in weight between the solution and the initial weight of the inert liquid. The saturated solution of (1) in (3) is allowed to return to ambient temperatures (about 18° to 24° C.) and the equilibrium concentration of the components determined using known analytical procedures, for example, vapor phase chromatography is an excellent method. Surprisingly, the solutions are stable for prolonged periods, for example, analysis after about one week at ambient temperatures shows no real decrease in component (1). The latter can be present in unexpectedly high proportions for a gas and it is not unusual to observe solutions wherein (1) is present in a weight percent range of from about 5 to about 20 percent in the inert liquid (3). However, when considering the overall component proportions of the blowing agents, it is desirable to express their values in respect of all three components which will be discussed below.

Once the gas has been dissolved in the inert liquid, the resulting solution can be routed in whatever direction is most convenient in leading to different aspects of the present invention. That is to say, it can be added as a separate stream along with all the other ingredients for making a foam. Alternatively, it can be premixed with the active hydrogen component and the intermediate halocarbon (2) prior to the foam formation step, or it can be premixed first with halocarbon (2). It is this latter route which leads to the mixed blowing agents of the invention and allows for a direct consideration of their respective proportions in the mixtures.

The gas/liquid solution is easily mixed with (2) using any mixing procedure desired under ambient conditions. No special precautions or cooling are required. The main objective of these blowing agent mixtures is the production of closed cell foamed polymers having maximum thermal insulation properties but with reduced levels of hard halocarbons. Accordingly, the proportions of the three components are governed by these considerations, by the foam densities desired, and, of course, by the maximum amount of the gaseous component which can be dissolved in the mixture. While almost any foam density within a range of from about 1.5 to about 20 pounds per cubic foot may be obtained, it is preferred to produce foams with densities in a range of from about 1.6 to about 4.0 p.c.f., most preferably, from about 1.8 to about 2.2 p.c.f. Additionally, those halocarbons falling within the group (2) are possessed of the optimum vapor pressures and K-factor properties for making foams with the most desirable properties. With all of these considerations in mind, the components are advantageously combined in the following weight percent proportions to total 100 percent: (1) from about 2 to about 25 percent, (2) from about 30 to about 90 percent, and (3) from about 8 to about 45 percent. Preferably, the proportions are from about 4 to about 10 percent, from about 50 to about 75 percent and from about 20 to about 40 percent, respectively.

The proviso that at least one of the components of the mixture contains at least one hydrogen atom is to ensure that at least one of the agents is a soft blowing agent thereby decreasing the level of hard component and thus decreasing the ozone depletion potentials. It is preferable that more than one hydrogen atom be present. However, there is a limit to the number of hydrogen atoms which can be present and still maintain optimum foam properties in any resulting closed cell foam polymer. The hydrogen containing blowing agent is not limited to any one particular component of the mixture. Additionally, each one of the components may contain hydrogens. However, to achieve maximum blowing properties with optimum hard blowing agent reduction, it is preferred that the gaseous component (1) and inert liquid (3) each contain hydrogen atoms.

Component (1) is described as a halocarbon defined above and as having a boiling point below about 10° C. making it gaseous under normal conditions of ambient temperature and atmospheric pressure. Generally speaking, the boiling point will fall within a range of from about 5° C. to about −50° C., preferably from about 5° C. to about −25° C., most preferably from about 5° C. to about −15° C. While this class of halocarbons can include aliphatic as well as cycloaliphatic compounds defined above with the appropriate halogen substitutions, the preferred subclass comprises haloalkanes having 1 to 2 carbons with a boiling point from about 5° C. to about −25° C. and preferably being substituted by chlorine and/or fluorine and hydrogen. Illustrative of component (1) are 1,1,2-trifluoroethane (F-143), 1,1-dichloro-1,2,2,2-tetrafluoroethane (F-114a), 1,2-dichloro-1,1,2,2-tetrafluoroethane (F-114), cyclic $C_4F_8$ (F-C318), 1-chloro-1,1-difluoroethane (F-142b), 1-chloro-1,1,2,2-tetrafluoroethane (F-124a), 1-chloro-1,2,2,2-tetrafluoroethane (F-124), bromodifluoromethane (F-22B1), 1,1,2,2-tetrafluoroethane (F-134), 1,1-difluoroethane (F-152a), 1,1,1,2-tetrafluoroethane (F-134a), dichlorodifluoromethane (F-12), 1-chloro-1,1,2,2,2-pentafluoroethane (F-115), perfluoropropane (F-218), chlorodifluoromethane (F-22), 1,1,1-trifluoroethane (F-143a), 1,1,1,2,2-pentafluoroethane (F-125), and the like, and mixtures thereof.

A preferred group of these halocarbons comprises 1,1-difluoroethane, 1,1,1-chlorodifluoroethane, 1-chloro-1,1,2,2-tetrafluoroethane, 1-chloro-1,2,2,2-tetrafluoroethane and mixtures thereof.

Component (2) is also defined above as a halocarbon but having a higher boiling point than (1). The boiling point falls within the range of from about 20° C. to about 35° C. It will be appreciated by one skilled in the art that this boiling range offers the optimum temperature for matching good blowing action with the vaporization of the halocarbon by the reaction exotherm of the polymer forming process. As in the case of (1) above, a preferred subclass comprises haloalkanes having 1 to 2 carbons and preferably substituted by chlorine and/or fluorine and hydrogen. More preferably, component (2) comprises a chlorofluoroalkane. Illustrative compounds are trichlorofluoromethane (F-11), 1,1-dichloro-2,2,2-trifluoroethane (F-123), and 1,1,1-dichlorofluoroethane (F-141b), and mixtures thereof. Trichlorofluoromethane is particularly preferred.

Component (3) or inert organic liquid defined above can be regarded as the main solvent for the gaseous component (1). In this role it can have a relatively high boiling range because it is partially offset by the gaseous nature of (1). Accordingly, the boiling range can be from about 35° C. to about 125° C., preferably from about 40° C. to about 100° C. In its broadest scope, this solvent component can be selected from a much wider classification of liquids as defined above provided it carries no groups capable of reacting with any of the polymer forming ingredients when the blowing action occurs, and further provided that it meets with boiling ranges above. Another limitation which requires consideration is the detrimental effect on the flammability characteristics of a foam blown with a high concentration of hydrocarbon blowing agents. Therefore, the aliphatic and cycloaliphatic organic liquids are not preferred even through they will operate efficiently in the role of solvent and blowing action.

Accordingly, the halocarbons comprise the preferred class for component (3). More preferred are the hydrogen containing haloalkanes having 1 to 2 carbons with a boiling point of from about 40° to about 100° C. and preferably being substituted by chlorine. Illustrative of component (3) are pentane, 2,2-dimethylpentane, 2,3-dimethylpentane, 2,4-dimethylpentane, hexane, 1-hexene, 2-hexene, 3-hexene, 2-methyl-2-hexene, 3-methyl-2-hexene, heptane, 1-heptene, cyclopentane, cyclopentene, cyclohexane, cyclohexene, cycloheptane, cycloheptene, and the like; methylene chloride, 1,2-dichloroethylene, ethylidene chloride, chloroform, 2,2-dichloropropane, 1,1,1-trichloroethane, carbon tetrachloride, 1-bromo-1-chloroethane, ethylene chloride (1,2-dichloroethane), trichloroethylene, methylenebromide, propylene chloride, 1-bromo-2-chloroethane, ethylidene bromide, 1,1,2-trichloroethane tetrachloroethylene, trimethylene chloride, 1,1,2,2-tetrafluoro-1,2-dibromoethane (F-114B2), 1,2,2-trichloro-1,1,2-trifluoroethane (F-113), 1,1,2,2-tetrachloro-1,2-difluoroethane (F-112), and the like; and mixtures thereof.

Preferred amongst the illustrative examples above are those haloalkanes containing chlorine and hydrogen. A particularly preferred group comprises methylene chloride, dichloroethane, trichloroethane, and mixtures thereof.

In the preparation of the blends of blowing agent combinations with the active hydrogen containing compounds, the proportions selected are those which will provide the desired foam densities in the resulting rigid cellular polymers. Generally speaking, the mixed blowing agent will be employed at a level of from about 1 to about 50 percent by weight based on the combined weight of the mixed blowing agent and active hydrogen containing compounds. Preferably the mixed blowing agent falls within a range of from about 10 to about 40, most preferably, 25 to 35 percent by weight. Regardless of how the actual blends are prepared, whether it be the addition of all three components as a premixed solution or the addition of (1) dissolved in (3) separate from the addition of (2), the proportions added are such as to fall within the above ranges. The actual mixing operation is readily carried out using any conventional or desired means for mixing liquids together. If the primary purpose is the preparation of blends for storage or transportation, then it is preferred that the blending be carried out in an inert atmosphere such as nitrogen or argon prior to being packaged or placed in drums.

The active hydrogen containing compounds defined above include the polymeric polyols and polymeric polyamines. It will be obvious to one skilled in the art that when polyols are employed, the resulting rigid cellular polymers will have urethane linkages. Alternatively, in the case of polyamines, the recurring linkages will be urea. Mixtures of polyol with polyamine will result in polyurethane-polyurea.

In respect of the polymeric polyamines, the functionality is, generally speaking, from about 2 to about 4 of primary and/or secondary amine terminated polymers, preferably primary amine terminated polyethers. More preferably, the primary amine terminated polyethers have a functionality of from about 2 to about 3 and molecular weight from about 400 to about 6,000. A preferred group of polyamines are the polyalkyleneoxy polyethers having at least 50 percent and up to about 90 percent of their terminal groups as primary amines with the balance as hydroxyl groups. Such polyamines are taught and their preparation described in typical U.S. Pat. Nos. 4,433,067 and 3,654,370 whose disclosures relative thereto are incorporated herein by reference.

Preferably, the active hydrogen compound is a polymeric polyol and can be any organic polyol provided it has at least 2 hydroxyl groups and a molecular weight from about 225 to about 12,000 or average value thereof. It is to be understood that, if desired, mixtures of polymeric polyols can be employed. Advantageously, the polyol has a functionality from about 2 to about 8 or average value thereof and includes polyether polyols, polyester polyols, reinforced or polymer polyols, polycarbonate polyols, resole polyols, polybutadiene based polyols, and the like. It will be noted that the lower molecular weight limitation of 225 set forth above is unusually low for the more conventional polymeric polyols. However, this lower limit is meant to include a most preferred class of so-called crude polyester polyols which will be discussed in detail below.

In respect of the conventional polymeric polyols, generally speaking, their molecular weight will fall within the range of about 1,000 to about 12,000, preferably from about 1,500 to about 6,000 with a functionality from about 2 to about 6. Illustrative, but not limiting, of the classes of such polyols which can be used are the polyoxyalkylene polyethers; polyester polyols; polyol adducts derived from ethylene oxide with methylenedianiline and polymethylene polyphenylamine mixtures (in accordance with U.S. Pat. No. 3,499,009); polyols obtained by the Mannich condensation of a phenolic compound with formaldehyde, an alkanolamine, and ethylene oxide (in accordance with U.S. Pat. No. 3,297,597); vinyl reinforced polyether polyols or polymer polyols, e.g. by the polymerization of styrene or acrylonitrile in the presence of the polyether; polyacetals prepared from glycols such as diethylene glycol and formaldehyde; polycarbonates, for example those derived from butanediol with diarylcarbonates; polyester amides; the resole polyols (see *Prep. Methods of Polymer Chem.* by W. R. Sorenson et al., 1961, page 293, Interscience Publishers, New York, N.Y.); and the polybutadiene resins having primary hydroxyl groups (see *Poly Bd. Liquid Resins*, Product Bulletin BD-3, October 1974, Arco Chemical Company, Div. of Atlantic Richfield, New York, N.Y.).

A preferred group of conventional polyols comprises the polyalkyleneoxy polyols particularly the propyleneoxy-polyethyleneoxy capped polyols obtained by the alkoxylation of water, ammonia, ethylene glycol, propylene glycol, trimethylolpropane, pentaerythritol, mannitol, sorbitol, aniline, ethanolamine, ethylene diamine, and the like; the polyester diols obtained from the reaction of dibasic carboxylic acids such as succinic, adipic, suberic, azelaic, phthalic, isophthalic, and the like with alkylene glycols and oxyalkylene glycols to form the corresponding polyalkylene, and polyoxyalkylene ester diols or copolymers thereof; and the vinyl-resin reinforced propyleneoxy-ethyleneoxy capped diols and triols, particularly those polymer polyols reinforced with acrylonitrile.

The most preferred crude polyester polyols for the present blends are obtained from crude reaction residues or scrap polyester resins by their transesterification with low molecular weight glycols. Generally speaking, they consist of mixtures of a number of low and higher molecular weight hydroxyl containing components. Thus, their average molecular weights or equivalent weights are low. Generally speaking, the molecular weight falls within a range of from about 225 to about 5,000 with a functionality from about 2 to about 6. Preferably, the average molecular weight falls within a range of about 250 to about 1,500 with average functionalities of about 2 to about 4 with predominantly primary hydroxyl groups. A most preferred class of crude polyester polyol has an average molecular weight from about 250 to about 1,000 and average functionality from about 2 to about 3.

Those polyester polyol mixtures obtained from crude reaction residues include a number of sources. One such source comprises the polyester polyols derived from phthalic anhydride bottoms as disclosed in U.S. Pat. No. 4,521,611 whose disclosure relative thereto is incorporated herein by reference. Another source is exemplified by the mixtures derived from the so-called DMT (dimethyl terephthalate) process residues by transesterification with low molecular weight aliphatic glycols. Typical DMT polyester polyols, for example, are disclosed in U.S. Pat. No. 3,647,759 which disclosure is incorporated herein by reference in its entirety and wherein the residue derived from DMT production via air oxidation of p-xylene is utilized. The oxidate residue contains a complex mixture of polycarbomethoxy substituted diphenyls, polyphenyls, and benzylesters of the toluate family. This residue is transesterified with an aliphatic diol such as ethylene glycol, propylene glycol, diethylene glycol, dipropylene glycol, and the like to produce a variety of low cost, predominately hydroxyl-functional polyester polyols with a wide variety of physical properties. Such DMT derived polyester polyols are produced under the name TERATE® 200 series resin polyols supplied by Hercules Inc.

Those polyester polyol mixtures obtained from scrap polyester resins are best exemplified by the mixtures obtained by digesting scrap polyethylene terephthalate (PET) with low molecular weight aliphatic glycols. Typical are the aromatic ester based polyols derived from digesting polyalkylene terephthalate with organic diols and triols having a molecular weight from 62 to 500 as disclosed in U.S. Pat. No. 4,048,104 which disclosure relative thereto is incorporated herein by reference; the aromatic polyester polyols obtained from the reaction of polyethylene terephthalate residue with alkylene oxides in the presence of a basic catalyst as disclosed in U.S. Pat. No. 4,439,549 incorporated herein by reference; the aromatic polyester polyols derived from recycled polyethylene terephthalate waste streams, alkylene glycols, and dibasic acid waste streams as disclosed in U.S. Pat. No. 4,439,550 and U.S. Pat. No. 4,444,918 which disclosures relative thereto are incorporated herein by reference; the aromatic polyester polycarbonate polyols derived from polyethylene terephthalate residues and alkylene carbonates as disclosed in U.S. Pat. No. 4,465,793 which disclosure relative thereto is incorporated herein by reference; the liquid terephthalic ester polyols derived from recycled or scrap polyethylene terephthalate and diethylene glycol and one or more oxyalkylene glycols as disclosed in U.S. Pat. No. 4,469,824 which disclosure relative thereto is incorporated herein by reference; the polyester polyols made by first reacting recycled polyethylene terephthalate scrap with an alkylene glycol followed by reaction with an alkylene oxide as disclosed in U.S. Pat. No. 4,485,196 which disclosure relative thereto is incorporated herein by reference; the copolyester polyols comprising the reaction products of an aromatic component selected from phthalic derivatives, polyethylene terephthalate, or dimethyl terephthalate with dibasic acid compounds, at least one primary hydroxyl glycol, and at least small amounts of a secondary hydroxyl glycol as taught in U.S. Pat. No. 4,559,370 which disclosure is incorporated herein by reference; and the like.

The rigid cellular polymers in accordance with the present invention are readily prepared by bringing together under foam forming conditions a polyisocyanate, the active hydrogen containing material, and the blowing agent combination. The latter two components can be added either in the preblended form of the invention or as separate streams. Any of the mixing methods known in the polyurethane art can be employed. For example, see Saunders and Frisch, Vols. I and 11, *Polyurethanes Chemistry and Technology*, 1962, John Wiley and Sons, New York, N.Y. Obviously, when the active hydrogen composition is a polymer polyol, the rigid foam will have recurring urethane linkages, while the polyamines will result in polyureas. If polyisocyanurate linkages are desired, then a stoichiometric deficiency of active hydrogen component is used along with an isocyanate trimerization catalyst; for example, see U.S. Pat. No. 3,986,991 whose disclosure relative to the preparation of cellular polyisocyanurates is incorporated herein by reference. If it is desired to make rigid cellular foams having carbodiimide linkages, then a catalyst for the formation of carbodiimide from isocyanate is included in the foam forming mixture; for teaching relative to polycarbodiimide formation see U.S. Pat. No. 3,657,161 whose disclosure is incorporated herein by reference. Combinations of the recurring units of polyurethane/carbodiimide/isocyanurate can be obtained as taught typically in U.S. Pat. No. 3,887,501 whose disclosure is incorporated herein by reference. The recurring linkages of amide and imide can be introduced into the present rigid polymers by employing aliphatic and aromatic dicarboxylic acids, and dianhydrides as coreactants as taught in U.S. Pat. No. 3,723,364 whose disclosure is incorporated herein by reference. Accordingly, the rigid cellular materials or foams are prepared by bringing together the foam forming ingredients either by hand-mix method for small scale preparation or machine mixing techniques including high pressure impingement mixing or the like to form buns, slabs, laminates, pour-in-place, spray-on-foams, froths, reaction injection molded bodies, and the like.

The polyisocyanate component used in accordance with the present invention can be any aromatic polyisocyanate known to be useful in the preparation of rigid polyurethane foams. Illustrative but non-limiting examples are m- and p-phenylene diisocyanate, methylenebis(phenyl isocyanate), polymethylene poly(phenyl isocyanates), 2,4-, 2,6-toluenediisocyanates and mixtures thereof, quasi prepolymers based on toluene diisocyanates (TDI), dianisidine diisocyanate, bitolylene diisocyanate, naphthalene-1,4-diisocyanate, and the like.

A preferred group of polyisocyanates comprise the polymethylene poly(phenyl isocyanates), particularly the mixtures containing from about 20 to about 85 percent by weight of methylenebis(phenyl isocyanate) with the remainder of the mixture comprising polymethylene poly(phenyl isocyanates) of functionality greater than 2; and mixtures of these polymethylene poly(phenyl isocyanates) with isocyanate terminated quasi prepolymers prepared from 2,4-, 2,6-toluenediisocyanates and mixtures thereof with less than 0.5 equivalency of at least one polyol component; an even more preferred TDI quasi prepolymer for use in combination with polymethylene poly(phenyl isocyanates) is one wherein the TDI reactant is a crude undistilled TDI containing a major proportion (70–90 percent) of pure toluene diisocyanate with the residue being phosgenation by-products of the toluene diamine. This crude TDI can be, optionally, partially trimerized (about 10 to 25 percent by weight) prior to reaction with deficient polyol to form the quasi prepolymer; this is in accordance with the general procedure set forth in U.S. Pat. No. 3,652,424. The proportions of the two components are not critical but preferably the quasi prepolymer does not exceed about 60 percent by weight of the polyisocyanate mixture; preferably the mixture comprises 40 to 75 percent by weight of polymethylene poly(phenyl isocyanate) with the balance being the quasi prepolymer.

The proportions of reactants will depend on what specific type of rigid cellular polymer is being prepared. Generally speaking, the proportions are such that the ratio of isocyanate equivalents to total active hydrogen equivalents falls within a range of from about 0.90:1 to about 4:1 provided that when the ratio exceeds about 1.15:1 the appropriate catalyst is present to form whatever isocyanate self-condensation product is desired; for example, carbodiimide catalyst, isocyanurate catalyst and the like. Preferably, polyisocyanurate is the copolymer linkage along with urethane linkages. Accordingly, when the ratio exceeds 1.15:1, it is preferable to employ an isocyanurate catalyst. A preferred NCO:active hydrogen ratio falls in a range of from about 1.75:1 to 3:1. This is to say, it is preferred to prepare rigid polyurethane-polyisocyanurate cellular polymers in accordance with the present invention.

Illustrative urethane catalysts are organometallic catalysts such as stannous octoate, dibutyl tin dilaurate, tin mercaptide, and the like; amine catalysts such as triethylenediamine, tetramethylethylenediamine, bis(2-dimethylaminoethyl)ether, triethylamine, tripropylamine, tributylamine, triamylamine, pyridine, quinoline, dimethylpiperazine, piperazine, N,N-dimethylcyclohexylamine, N-ethylmorpholine, 2-methylpiperazine, N,N-dimethylethanolamine, tetramethylpropanediamine, methyltriethylenediamine, and the like, and mixtures thereof. Preferred are the tertiary amines. The proportions in which the urethane catalysts can be employed are readily determined by trial and error for the optimum rise conditions. Generally speaking, the catalyst will fall within a range of about 0.01 to about 5 parts per 100 parts of the polyol, preferably within a range of 0.1 to 1 part.

Illustrative trimer catalysts include the following groups:

(1) Tertiary amine compounds which include N,N-dialkylpiperazines such as N,N-dimethylpiperazine, N,N-diethylpiperazine and the like; trialkylamines such as trimethylamine, triethylamine, tributylamine and the like; 1,4-diazabicyclo[2.2.2]octane, which is more frequently referred to as triethylene diamine, and the lower-alkyl derivatives thereof such as 2-methyltriethylenediamine, 2,3-dimethyltriethylene diamine, 2,5-diethyltriethylene diamine and 2,6-diisopropyltriethylene diamine; N,N',N''-tris(dialkylaminoalkyl)hexahydrotriazines such as N,N',N''-tris(dimethylaminomethyl)hexahydrotriazine, N,N',N''-tris(dimethylaminoethyl)hexahydrotriazine, N,N',N''-tris(dimethylaminopropyl)hexahydrotriazine; mono-, di-, and tri(dialkylaminoalkyl)monohydric phenols or thiophenols such as 2-(dimethylaminomethyl)phenol, 2,4-bis(dimethylaminomethyl)phenol, 2,4,6-tris(dimethylaminomethyl)phenol, and the like; N,N,N',N'-tetraalkylalkylenediamines such as N,N,N',N'-tetramethyl-1,3-propanediamine, N,N,N',N'-tetramethyl-1,3-butanediamine, N,N,N',N'-tetramethylethylenediamine N,N,N',N'-tetraethylethylenediamine and the like; N,N-dialkylcyclohexylamines such as N,N-dimethylcyclohexylamine, N,N-diethylcyclohexylamine, and the like; N-alkylmorpholines such as N-methylmorpholine; N-ethylmorpholine and the like; N,N-dialkylalkanolamines such as N,N-dimethylethanolamine, N,N-diethylethanolamine and the like; N,N,N',N'-tetraalkylguanidines such as N,N,N',N'-tetramethylguanidine, N,N,N',N'-tetraethylguanidine and the like. The preferred tertiary amine catalysts for use in the process of the invention are triethylene diamines, the N,N',N''-tris(dialkylaminoalkyl)hexahydrotriazines, the mono(dialkylaminoalkyl)phenols, and the 2,4,6-tris(dialkylaminoalkyl)phenols.

(2) Alkali metal salts of lower alkanoic acids such as the sodium, potassium, or lithium salts of formic acid, acetic acid, propionic acid, butyric acid, isobutyric acid, valeric acid, caproic acid, heptanoic acid, caprylic acid, 2-methylhexanoic acid, 2-ethylhexanoic acid, and the like. A preferred member of this group is potassium 2-ethylhexanoate.

(3) Combinations of an alkali metal salt of an N-substituted amide with an alkali metal salt of an N-(2-hydroxyphenyl)methyl glycine; and optionally a tertiary amine trimerization catalyst in accordance with the teaching of U.S. Pat. No. 3,896,052.

(4) Combinations of a tertiary amine trimerization catalyst with an alkali metal salt of an N-substituted amide and a dibutyl tin di(alkanoate) in accordance with the teaching of U.S. Pat. No. 3,899,443.

(5) Combinations of monomeric epoxides with a tertiary amine trimerization catalyst containing a dimethylamino group and an alkali metal salt of an N-(2-hydroxyphenyl)methyl glycine in accordance with the teaching of U.S. Pat. No. 3,903,018.

(6) Combinations of a tertiary amine trimerization catalyst and a quaternary ammonium salt of an alkanoic acid in accordance with the teaching of U.S. Pat. No. 3,954,684.

Generally speaking, the proportions of trimer catalyst will fall within a range of about 0.01 to about 10 parts per 100 parts of the polyol, preferably within a range of about 0.5 to 3 parts.

Other preferred ingredients employed under the foam forming conditions are dispersing agents, cell stabilizers, and surfactants. Surfactants, better known as silicone oils, are added to serve as cell stabilizers. Some representative materials are sold under the names of SF-1109, L-520, L-521, L-5420, L-5430 and DC-193 which are, generally, polysiloxane polyoxyalkylene block co-polymers, such as those disclosed in U.S. Pat. Nos. 2,834,748; 2,917,480; and 2,846,458, for example.

When employed, the surfactant represents from about 0.05 to about 5, and, preferably 0.1 to 2 weight percent of the total ingredient weight.

Other optional additives for the foams of the invention can include from zero to 20, preferably from about 2 to about 15 parts of a flame retardant such as tris(2-chloroethyl)phosphate, tris(2-chloropropyl)-phosphate, tris(2,3-dibromopropyl)phosphate, tris(1,3-dichloropropyl)phosphate, diammonium phosphate, various halogenated aromatic compounds, antimony oxide, alumina trihydrate, polyvinyl chloride, and the like, and mixtures thereof. Other additives such as carbon black, colorants, and the like can be added. The addition of fillers such as barium sulfate may be used in such proportions that do not detract from the K-factor of the foams.

The surprising feature of the present invention is the fact that blowing agents are provided which have a reduction in hard halocarbon content of as high as 60 percent yet rigid closed cell polyurethane and polyurethane-polyisocyanurate foams can be prepared in the conventional 2 pound density range which have insulation properties quite comparable to foams made with 100 percent F-11. This reduction in hard halo-carbons is considered to be of substantial benefit in attempts to solve the ozone depletion problem in the earth's atmosphere.

The following examples describe the manner and process of making and using the invention and set forth the best mode contemplated by the inventor of carrying out the invention but are not to be construed as limiting.

EXAMPLE 1

This experiment describes the preparation of two blowing agent compositions with resulting active hydrogen compositions, as well as two rigid polyurethane-polyisocyanurate foams A and B all in accordance with the present invention. Also described are three blowing agent combinations with their corresponding polyurethane-polyisocyanurate foams not in accordance with this invention as comparisons 1 through 3.

The ingredients are employed in the proportions by weight set forth in Table I below. The preparation of the first blowing agent under the column A of Table I is carried out as follows. A 4-neck round bottom one liter flask is charged with 650 gm of trichloroethane (TCE). The flask is equipped with a thermometer, dry-ice condenser vented through a drying tube and a gas-inlet tube. The TCE is cooled to below 10° C. and a stream of 1-chloro-1,1-difluoroethane (F-142b, b.p. = −10° C.) is passed through a copper coil chilled to about 0° C. and into the flask. The TCE is saturated with the gaseous halocarbon and the mixture allowed to return to ambient temperature (about 20° C.). The solution is allowed to stand over a weekend then analyzed by vapor phase chromatography to assay out to a mixture of 83.4 percent by weight of TCE and 16.6 percent of F-142b. Under room temperatures and atmospheric pressure this solution is completely stable for at least a week.

The gas/liquid solution in the proportions set forth in Table I under A (11 gms or 1.8 g F-142b and 9.2 g TCE) is either premixed first with the F-11, or, alternatively blended separately with the F-11 into the polyol and other ingredients in the proportions set forth in Table I to provide the active hydrogen composition under component B. Foam A is prepared by mixing the B component ingredients in a plastic tub to be followed by the polyisocyanate under the A component. Both components at about 72° C. are rapidly mixed for about 10 seconds using a high speed drill press motor equipped with a 4 inch diameter Conn agitator. The mixed reactants are immediately poured into a 14"×14"×14" cardboard box where the resulting foam is allowed to rise freely. The foam is allowed to cure for at least three days under ambient temperatures before initial K-factor is determined and the appropriate physical tests carried out on the foams.

It is noteworthy that completely miscible polyol blends (component B) are obtained even with the aromatic polyester polyol employed with its primary hydroxyl groups. This miscibility did not change with storage.

Blowing agent mixtures, polyol blends, and Foam B are similarly prepared except for the increased proportion (17.6 g or 2.9 g F-142b and 14.7 g TCE) of the gas/liquid solution prepared above with the lowered amount of F-11 as set forth in Table 1. Comparisons 1 to 3, do not require any gas/liquid saturation because the blowing agent components are all liquid under ordinary atmospheric conditions. All of the foam samples are prepared as described above using the proportions of ingredients set forth in Table I.

Comparison 1 is a control in that it has all F-11 blowing agent. The foam derived therefrom is characterized by the density and K-factor properties along with friability and compressive strength measurements in the parallel and perpendicular to rise directions set forth in Table 1. K-factor increases with time as is expected.

Foam A of the invention with a 25 percent by weight replacement of the F-11 has only a very slightly higher initial K-factor than comparison 1 but the aging K-factor and the other physicals are comparable or virtually identical to comparison 1 even though the F-11 blowing agent of optimum choice is considerably reduced.

Foam B of the invention with 40 percent F-11 replaced while having somewhat higher K-factors than comparison 1 still retains sufficiently good physical and insulation properties to be useful even with the greatly reduced hard halocarbon level.

Lowering of the F-11 by 25 percent in comparison 2 results in a definitely higher K-factor profile when compared with foam A with its 25 percent F-11 reduction. It should be noted that the K-factor test periods in comparisons 2 and 3 are not strictly equivalent to those for A, B, and comparison 1 but are close enough to be significant. Where the periods do differ, the days are marked in parenthesis after the K-factor determinations.

TABLE I

| Ingredients (pts. by wt.) | Foams | | | | |
|---|---|---|---|---|---|
| | A | B | Comp 1 | Comp 2 | Comp 3 |
| Component A | | | | | |
| Polyisocyanate[1] | 180.1 | 180.1 | 180.1 | 180.1 | 180.1 |
| Component B | | | | | |
| PS-2852[2] | 100 | 100 | 100 | 100 | 100 |
| DC-193[3] | 1.5 | 1.5 | 1.5 | 1.5 | 1.5 |
| Urethane Catalyst[4] | 0.3 | 0.3 | 0.3 | 0.3 | 0.3 |
| Trimer Catalyst[5] | 2.1 | 2.1 | 2.1 | 2.1 | 2.1 |
| Blowing Agent | | | | | |
| F-11 | 33 | 26.4 | 44 | 33 | 28.6 |
| F-142b | 1.8 | 2.9 | — | — | — |
| Trichloroethane | 9.2 | 14.7 | — | 11 | — |
| Methylene chloride | — | — | — | — | 9.5 |
| % F-11 replacement | 25 | 40 | 0 | 25 | 35* |
| Index (NCO/OH) | 2.5 | 2.5 | 2.5 | 2.5 | 2.5 |

TABLE I-continued

| Ingredients (pts. by wt.) | A | B | Comp 1 | Comp 2 | Comp 3 |
|---|---|---|---|---|---|
| Properties | | | | | |
| Density, pcf | 1.90 | 1.89 | 1.85 | 1.91 | 1.81 |
| K-factor[6] btu-in/hr. ft.$^2$ °F. | | | | | |
| Initial | 0.121 | 0.129 | 0.119 | 0.126 | 0.129 |
| 14 days | 0.139 | 0.148 | 0.138 | 0.145 | 0.154 |
| 39 days | 0.152 | 0.160 | 0.149 | 0.154 (30) | 0.166 (30) |
| 63 days | 0.156 | 0.164 | 0.154 | 0.160 (51) | 0.174 (51) |
| Friability[7] (%) | 21.5 | 22.6 | 21.1 | 19.5 | — |
| Compressive str., psi | | | | | |
| horizontal | 40.9 | 37.9 | 44.5 | 44.0 | — |
| perpendicular | 18.7 | 18.0 | 18.2 | 27.0** | — |

*% F-11 reduction based on the 44 parts required for Comparison 1 control foam.
** Anomalous result.

Footnotes to TABLE I
[1]Polyisocyanate: A polymethylene poly(phenyl isocyanate) mixture comprising about 29 percent by weight of methylenebis(phenyl isocyanate) with the balance of 71 percent being polymethylene poly(phenyl isocyanates) of functionality higher than 2; I.E. = about 138; viscosity (25° C.) = about 700 cps.
[2]PS-2852: Phthalic anhydride based aromatic polyester polyol prepared from a mixture of aliphatic glycols and containing about 14 weight percent of free diethylene glycol; average functionality = about 2; OH eq. wt. = about 190 to 207; supplied by Stepan Chemical.
[3]DC-193: Silicone surfactant; see "Dow-Corning 193 Surfactant" bulletin supplied by Dow-Corning Corporation.
[4]Urethane catalyst: N,N-dimethylcyclohexylamine.
[5]Trimer catalyst: Hexcem 977, a solution of about 75 percent by weight of potassium octoate and 25 percent diethylene glycol; supplied by Mooney Chemicals Inc.
[6]K-factor: measure of heat transfer in BTU-inch/hour ft$^2$ °F., measured in accordance with ASTM Test Method C-518.
[7]Friability: % wt. loss of foam samples measured in accordance with ASTM Test Method D-421.

EXAMPLE 2

This experiment describes the preparation of five blowing agent compositions, active hydrogen compositions and resulting rigid polyurethane-polyisocyanurate foams all in accordance with the invention under the columns C to G of Table II below. Comparison 4 sets forth a foam with blowing agent combination not in accordance with the invention.

The ingredients, proportions and procedures are identical to all those set forth in Example 1 except in the blowing agent combinations described as follows. For foams C to E the gaseous F-142b is dissolved in dichloroethane (DCE) using the same procedure outlined in Example 1 for dissolving it in the TCE. The resulting solution is a stable mixture of 17.5 percent by weight F-142b and 82.5 percent DCE which is then blended in the proportions of 11 g, 17.6 g, and 26.4 g for the three compositions C to E, respectively, to provide the F-142b and DCE in the proportions set forth in Table II. Under F and G blends of 11 g and 17.6 g, respectively, of a stable mixture of 6.7 percent by weight of 1,1-difluoroethane (F-152a) and 93.3 percent of TCE are employed to provide the individual F-152a and TCE proportions set forth in Table II. Comparison 4 employs 44 parts of the F-142b/DCE blowing agent combination alone to provide the component proportions set forth in Table II.

Foams C to E with F-11 replacement of 25 percent, 40 percent, and 60 percent, respectively, provide good initial K-factor and good physical properties all comparable to Comparison 1 foam of Table I. It should be noted the aged K-factors for Foams C and D are not as good as for those foams wherein 25 and 40 percent F-11 is replaced by the F-142b/TCE combination (see Table I Foams A and B). Also when 60 percent F-11 is replaced by the F-142b/DCE combination as in Foam E, there is some foam shrinkage.

Foams F and G provide good physical properties and K-factor but again the F-152a/TCE combination is not as good as the F-142b/TCE combination. However, there is still the 25 to 40 percent F-11 replacement.

Comparison 4 has no F-11 component whatsoever relying only on the F-142b/DCE combination. However, the resulting foam structure is so poor as to prohibit foam testing.

TABLE II

| Ingredients (pts. by wt.) | C | D | E | F | G | Comp. 4 |
|---|---|---|---|---|---|---|
| Component A | | | | | | |
| Polyisocyanate | 180.1 | 180.1 | 180.1 | 180.1 | 180.1 | 180.1 |
| Component B | | | | | | |
| PS 2852 | 100 | 100 | 100 | 100 | 100 | 100 |
| DC-193 | 1.5 | 1.5 | 1.5 | 1.5 | 1.5 | 1.5 |
| Urethane Catalyst | 0.3 | 0.3 | 0.3 | 0.3 | 0.3 | 0.3 |
| Trimer Catalyst | 2.1 | 2.1 | 2.1 | 2.1 | 2.1 | 2.1 |
| Blowing Agent | | | | | | |
| F-11 | 33 | 26.4 | 17.6 | 33 | 26.4 | 0 |
| F-142b | 1.9 | 3.1 | 4.6 | — | — | 7.7 |
| Dichloroethane | 9.1 | 14.5 | 21.8 | — | — | 36.3 |
| F-152a | — | — | — | 0.7 | 1.2 | — |
| Trichloroethane | — | — | — | 10.3 | 16.4 | — |
| % F-11 replacement | 25 | 40 | 60 | 25 | 40 | 100 |
| Index (NCO/OH) | 2.5 | 2.5 | 2.5 | 2.5 | 2.5 | 2.5 |
| Properties | | | | | | |
| Density, pcf | 1.81 | 1.80 | — | 1.74 | 1.77 | — |
| K-factor btu-in/hr. ft.$^2$ °F. | | | | | | |
| Initial (days) | 0.121 | 0.126 | 0.125 | 0.129 | 0.134 | Extensive shrinking after one day |
| | 0.148 (14) | 0.161 (14) | Shrinkage after ne day | 0.143 (6) | 0.150 (6) | |
| | 0.164 (57) | 0.176 (57) | | 0.166 (40) | 0.175 (40) | |
| Friability (%) | 16.4 | 17.9 | | 14.1 | 15.8 | |
| Compressive str., psi | | | | | | |
| horizontal | 37.5 | 29.1 | | 36 | 36 | |
| perpendicular | 13.5 | 11.3 | | 16 | 16 | |

What is claimed is:

1. A mixed blowing agent comprising: (1) from about 2 to about 25 percent by weight of at least one halocarbon blowing agent having a boiling point below about 10° C.; (2) from about 30 to about 90 percent by weight of at least one halocarbon blowing agent having a boiling point of from about 20° C. to about 35° C.; and (3) from about 8 to about 45 percent by weight of an inert organic liquid having a boiling point from about 35° C. to about 125° C., and provided at least one of said components (1), (2), or (3) contains at least one hydrogen atom.

2. A blowing agent according to claim 1 wherein said component (1) comprises a haloalkane having 1 to 2 carbons and a boiling point of from about 5° C. to about −25° C.

3. A blowing agent according to claim 1 wherein said component (2) comprises a chlorofluoroalkane.

4. A blowing agent according to claim 1 wherein said component (3) comprises a hydrogen containing haloalkane having 1 to 2 carbons and a boiling point of from about 40° C. to about 100° C.

5. A blowing agent according to claim 1 comprising:
   (1) from about 4 to about 10 percent by weight of at least one haloalkane having 1 to 2 carbons and a boiling point of from about 5° C. to about −25° C.;
   (2) from about 50 to about 75 percent by weight of at least one chlorofluoroalkane; and
   (3) from about 20 to about 40 percent by weight of at least one hydrogen containing haloalkane having 1 to 2 carbons and a boiling point of from about 40° C. to about 100° C.

6. A blowing agent according to claim 5 wherein the members of each of said component groups (1), (2), and (3) are respectively selected from the following groups each consisting essentially of:
   (1) 1,1-difluoroethane, 1,1,1-chlorodifluoroethane, 1-chloro-1,1,2,2-tetrafluoroethane, 1-chloro-1,2,2,2-tetrafluoroethane, and mixtures thereof;
   (2) trichlorofluoromethane, dichlorotrifluoroethane, dichlorofluoroethane, and mixtures thereof; and
   (3) methylene chloride, dichloroethane, trichloroethane, and mixtures thereof.

7. A blowing agent according to claim 6 comprising (1) 1,1,1-chlorodifluoroethane; (2) trichlorofluoromethane; and (3) trichloroethane.

8. A blend comprising at least one active hydrogen containing compound and from about 1 to about 50 percent by weight of said blend of a mixed blowing agent according to claim 1.

9. A blend according to claim 8 wherein said active hydrogen containing compound comprises a polymeric polyol having a functionality of from about 2 to about 8 and molecular weight from about 225 to about 12,000 or average value thereof.

10. A blend according to claim 9 wherein said polyol is a crude polyester polyol having a primary hydroxyl functionality of from about 2 to about 4 or average value thereof and a molecular weight from about 250 to about 1,500 or average value thereof.

11. A blend according to claim 10 comprising
   (i) a crude polyester polyol having a molecular weight of from about 250 to about 1,500 and primary hydroxyl functionality of from about 2 to about 4; and
   (ii) from about 25 to about 35 percent by weight based on (i) and (ii) of a blowing agent comprising (1) from about 4 to about 10 percent by weight of 1,1,1-chlorodifluoroethane; (2) from about 50 to about 75 percent by weight of trichlorofluoromethane; and (3) from about 20 to about 40 percent by weight of trichloroethane.

* * * * *